United States Patent [19]

Scott

[11] 3,913,376

[45] Oct. 21, 1975

[54] EXPOSURE TIME TESTING APPARATUS FOR FOCAL-PLANE CAMERAS

[76] Inventor: Thaddeus LeRoy Scott, 360 Hyde Drive, Hayward, Calif. 94544

[22] Filed: Dec. 5, 1973

[21] Appl. No.: 422,098

[52] U.S. Cl. .................... 73/5; 250/214 P; 324/186
[51] Int. Cl.² ...................... G04F 7/10; G04F 10/04
[58] Field of Search ......... 73/5; 250/214 P; 324/186

[56] References Cited
UNITED STATES PATENTS

| | | | |
|---|---|---|---|
| 3,229,497 | 1/1966 | Goldfarb | 73/5 |
| 3,603,133 | 9/1971 | Westhaver | 73/5 |
| 3,760,629 | 9/1973 | Westhaver | 73/5 |

OTHER PUBLICATIONS

Data File 112, *Time Interval Measurements* . . . . Berkely Div., Beckman Instr. Inc., Richmond, Calif., Feb., 1958.

Data File 112, *Time Interval Measurements* . . . . Berkely Div., Beckman Instr. Inc., Richmond, Calif., Feb, 1958.

*Primary Examiner*—Richard C. Queisser
*Assistant Examiner*—Frederick Shoon
*Attorney, Agent, or Firm*—Harris Zimmerman

[57] ABSTRACT

Herein is disclosed an apparatus and system for testing exposure times of focal-plane cameras of the shutter-curtain variety. After removal of the camera lens assembly and selection of the exposure time desired to be tested, there is fitted onto the camera body in front of its focal plane a removable testing unit comprising a light-tight cannister housing containing at least one vertical subminiature, high-intensity light source, at least one photosensitive photodiode, and electronic clock-timing circuitry. Also forming part of this system is a dummy roll of film, disposed within the focal plane, which is completely blackened except for a thin, vertical, light-reflecting strip. Said band is visually aligned with said light source parallel to the central axis of the camera aperture. To time exposure time, the light source is energized and the shutter curtains are released from spring loaded positions. A light beam from said source impinges upon the shutter curtains moving across the beam path until the normal exposure aperture between said curtains permits said beam to pass through said aperture and impinge upon said reflective band and be reflected back through said curtain aperture to impinge on said photodiode. Said diode then creates an electrical potential which enables said electronic clock-timing circuitry to output a signal susceptible to modulation for digital readout of exposure elapsed time on an external display device. When said curtains have traveled to the point where said aperture no longer passes the reflected light, the photodiode disables said circuitry, thereby stopping said clock and preserving the elapsed time readout.

Also disclosed is an apparatus for measuring exposure elapsed times at multiple locations across the path of travel of said shutter curtain.

2 Claims, 8 Drawing Figures

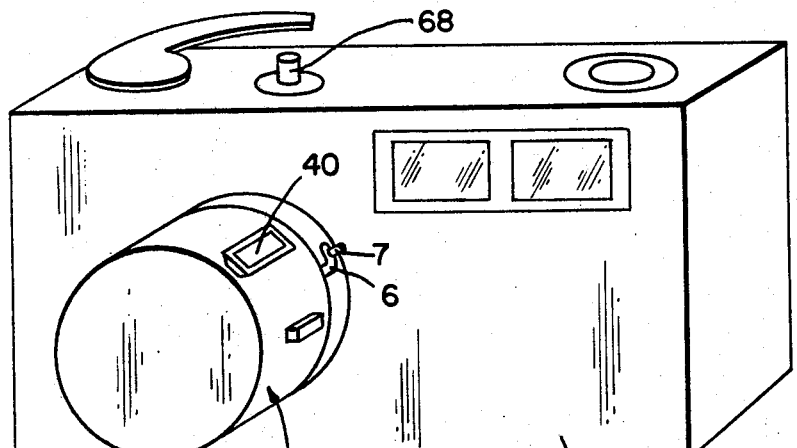
FIG_1
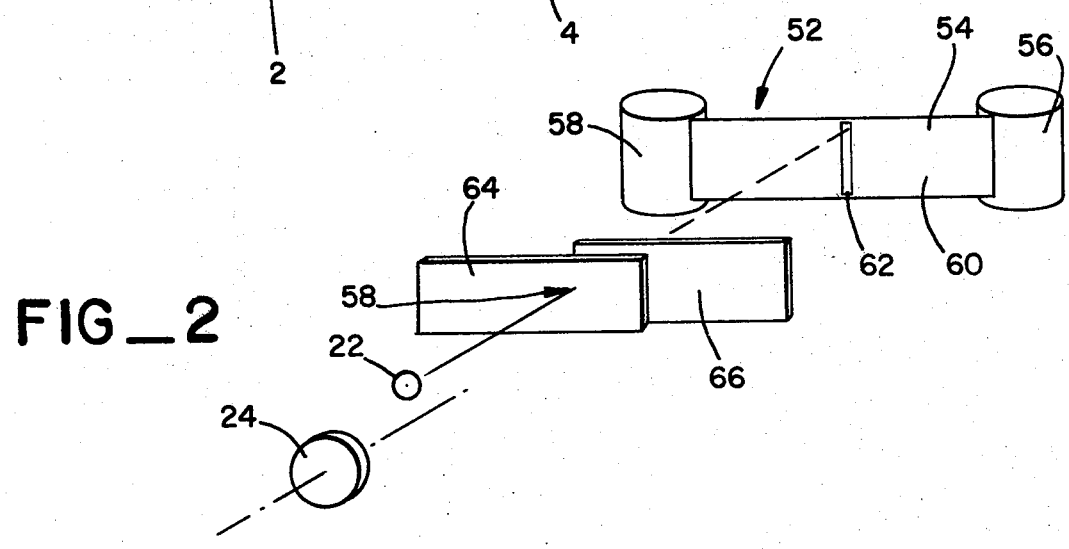
FIG_2
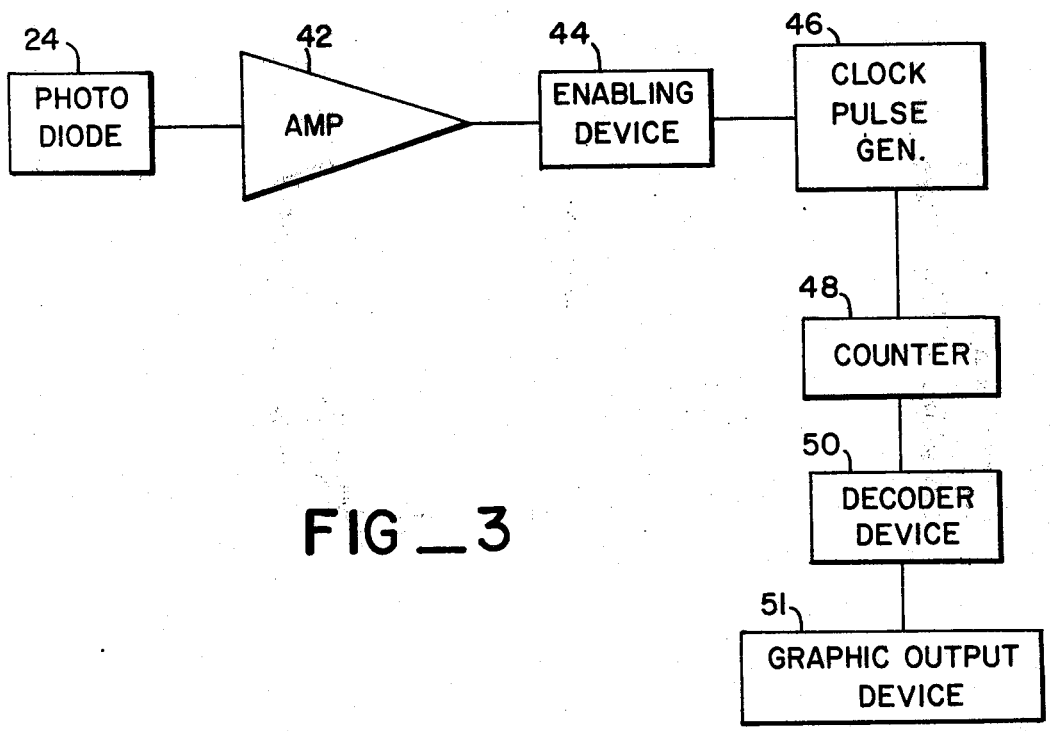
FIG_3

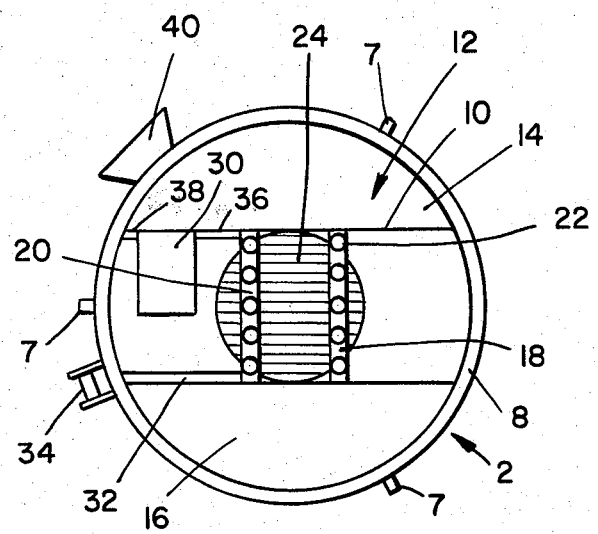
FIG_4
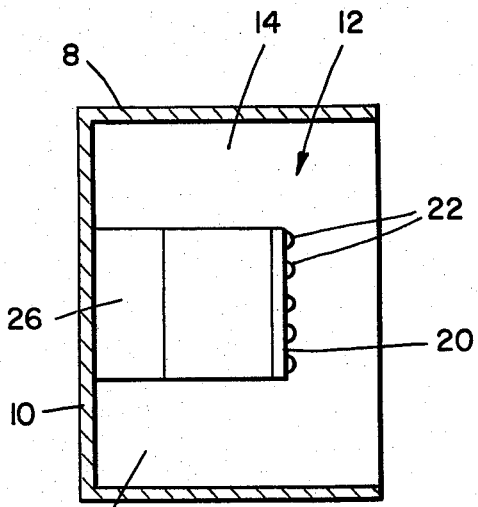
FIG_5
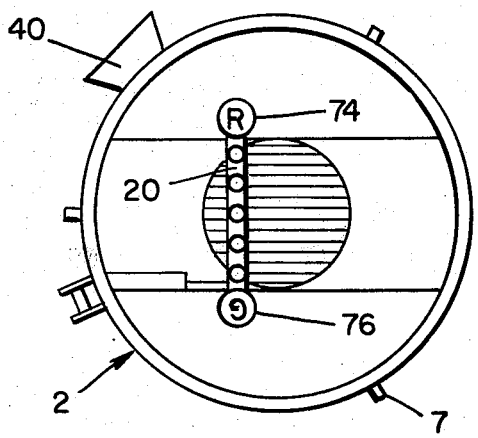
FIG_6
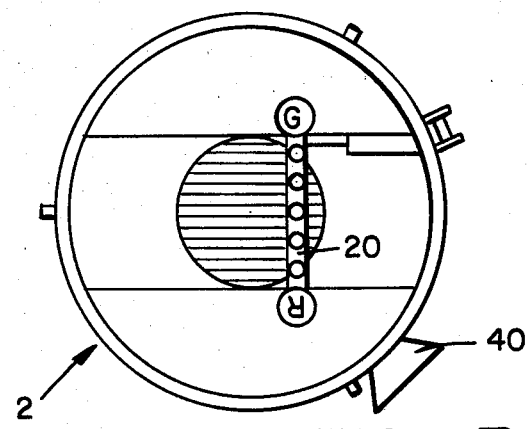
FIG_7
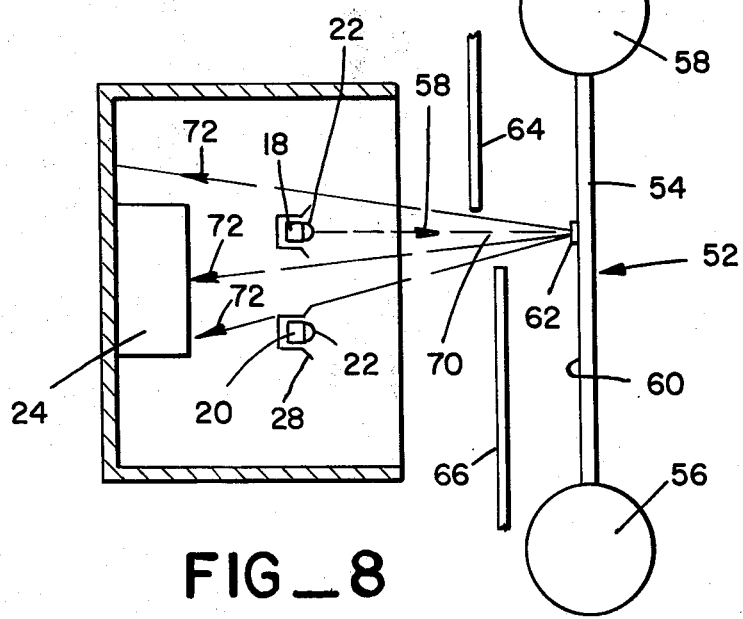
FIG_8

EXPOSURE TIME TESTING APPARATUS FOR FOCAL-PLANE CAMERAS

BACKGROUND OF THE INVENTION

The instant invention is primarily intended for use in measuring shutter exposure times in cameras of the type employing focal-plane shutters, a common type shutter used in many commercially-marketed, hand-held cameras. Focal-plane shutters generally comprise two black, opaque, flexible, spring-operated curtains which are moved, under spring load, in a straight line across the face of a film frame in a plane slightly forward of the focal plane to create an exposure-aperture slit. Exposure times are determined by the variable area of the slit and the speed of said curtains, as selected by the operator.

Present equipment for measuring exposure times of focal-plane shutters is expensive to purchase, difficult to maintain and repair, and requires a skilled operator because of complexity of operation. As a result, very few camera retailers offer their customers the service of testing exposure times. In fact, the amateur photographer can ordinarily only have his camera tested at clinics sponsored by major camera manufacturers on a rotating tour basis, generally limited to large metropolitan areas.

Hence, it is a purpose of the present invention to provide a small, inexpensive, yet accurate device for testing camera shutter speeds so as to make such a device reasonably available to both amateur photographers and independent camera retailers.

The Drawings

FIG. 1 is a perspective view of the apparatus of the instant invention as installed on a camera body.

FIG. 2 is a simplified perspective view illustrating the relative positions of the light source, shutter curtains, film roll, reflective strip and photodiode.

FIG. 3 is a block schematic of the electronic clock timing circuitry.

FIG. 4 is a front elevational view of the apparatus of the instant invention.

FIG. 5 is a side sectional view of the apparatus of the instant invention as shown in FIG. 4.

FIG. 6 is a front elevational view of an additional embodiment of the instant invention in a first position of orientation.

FIG. 7 is a front elevational view of the embodiment shown in FIG. 6, in a second position of orientation.

FIG. 8 is a top plan view of the apparatus of the instant invention as shown in FIG. 4.

DESCRIPTION OF THE PREFERRED EMBODIMENT

Referring to FIG. 1, it may be seen that the testing unit 2 of the instant invention is removably mounted on the body 4 of the camera whose exposure time is to be tested after the camera lens assembly has been removed. Said testing unit may be secured to said camera body by any of numerous fastening devices, such as an arrangement of slots 6 and pins 7, as illustrated in FIG. 1. With such an arrangement the testing unit is merely inserted on the same mountings as the removed lens assembly so that the slot engages said pin and is then rotatably twisted to secure the fit.

Although not shown in FIG. 1, the exposure-time selection mechanism on the camera body, often mounted at the base of the lens assembly, must be left attached to the camera body so that the desired exposure-time selections may be tested.

Referring to FIGS. 4 and 5, the internal construction of the testing unit may be seen. The unit's basic structural member is a generally cylindrical cannister housing 8 fitted with a generally circular backing plate 10 attached thereto. Pins 7 extend radially from the outer surface of cannister housing 8 and cooperatively engage complementary slots 6 in the camera body. When said cannister housing is so mounted, a light-proof closure 12 is formed bounded by said cannister housing 8, said backing plate 10 and said camera body 4. And, further, when said cannister housing is so mounted, its central cylindrical axis coincides with the central cylindrical axis of the exposure aperture barrel of the camera body.

Fixedly mounted within said cannister housing are upper and lower supporting members, 14 and 16 respectively, whose cross-sections are generally chordal, as seen best in FIG. 4. Vertically disposed between said supporting members are two lamp-socket receptacles 18 and 20 respectively, which are disposed on either side of the vertical centerline of said cannister housing and equidistantly spaced therefrom. Mounted upon each of said receptacles in vertically stacked and spaced relationship are a plurality of subminiature, high-intensity halogen lamps 22.

Horizontally spaced from said receptacles 18 and 20 and fixedly attached to the inner surface of backing plate 10 is a photosensitive photodiode 24 which is encapsulated in a stationary anchoring module 26. As is best seen in FIG. 5, lamps 22 are mounted on receptacles 18 and 20 such that they face away from said diodes and such that said receptacles are effectively interposed between said lamps and said diodes. Further, as illustrated in FIG. 8, said receptacles and lamps are surrounded by shielding elements 28. The purpose of this arrangement is to ensure that light emanating from said lamps cannot directly impinge upon said photodiode by travelling in a non-reflected, straight-line path.

As is best seen in FIG. 4, several additional elements are contained within cannister housing 8, i.e, electronic clock-timing circuitry (discussed infra), encapsulated within module 30, and several electrical conductors. Conductor 32 electrically connects lamp-socket receptacle 18 and its lamps 22 to a first set of pins on external plug connector 34. Similarly, an analogous electrical connector (not shown) connects receptacle 20 and its lamps to a second set of pins on external plug connector 34. Thus, to selectively energize lamps on either receptacle 18 or 20, an external source of electrical potential (such as a standard 120v AC house current) need merely be applied by plugging into either said first or said second set of pins on said external plug connector 34. Also contained within cannister housing 8 is an electrical conductor 36 which eventually connects photodiode 24 to said clock timing circuitry module 30, and an electrical conductor 38 which electrically connects said module to an external graphic display means 40 which is fixedly mounted on the outer cylindrical periphery of cannister housing 8.

A functional block schematic of the electronic clock timing circuitry is illustrated in FIG. 3. The photodiode 24 is electrically connected to a relatively low-noise, high-gain operational amplifier 42. The output of said amplifier is input to an enabling device 44, which is, basically, a relatively high-speed on/off switch. The enabling device is connected to a square-wave (1000k Hertz) clock-pulse generator 46. The output of said generator is input to an electronic counter 48, preferably of the decade counting variety, whose output is input to seven-segment binary-coded-decimal decoder 50. The decoder output is input to a seven-segment graphic-output device 51, preferably a light emitting diode (LED) or liquid crystal (LQ) digital display array.

In addition to the aforediscussed testing unit 2, the apparatus of the instant invention also includes a dummy roll of film 52, shown in FIGS. 2 and 8. Said roll of film is generally similar in appearance to standard camera film, being comprised of a generally elongated, rectangular, flexible strip 54 of acetate or mylar composition, said strip being suspended between a magazine reel 56 and a take-up reel 58. However, the instant film is completely balanced on its surface 60 which corresponds to the emulsion-coated surface of a standard roll of film, i.e., that surface which lies in the camera focal plane and faces the camera exposure aperture barrel. And said surface is further provided with a relatively thin, generally rectangular, photo reflective strip 62, such as a strip of mirrored glass, metallic foil or similar reflective substance.

OPERATION OF THE PREFERRED EMBODIMENT

The operation of the preferred embodiment is best made clear with reference to FIGS. 2 and 8. The operator, after opening the camera back plate and inserting the dummy roll of film 52 in standard fashion, visually aligns reflective strip 62 with lamp-socket receptacle 20 so as to be visually parallel to the central cylindrical axis of the exposure-aperture barrel of the camera body. An external electrical power source is connected to the second set of pins on external plug connector 34 to energize the lamps 22 located on receptacle 20, thereby causing said lamps to emit illumination in the direction of arrow 58, i.e, toward reflective strip 62. However, when the spring-loaded shutter curtains 64 and 66 have not yet been triggered by shutter button 68 (seen in FIG. 1), said curtains overlap, as shown in FIG. 2, and prevent said light from impinging upon reflected strip 62.

However, once shutter button 68 is depressed by the operator, the shutter curtains 64 and 66 are released from their retrained positions and, under said spring load, separate to create an exposure aperture slit 70 therebetween, as illustrated in FIG. 8. Said light emanating from said bulbs is permitted to pass through said slit in the direction of arrow 68, impinge upon reflective strip 62, and be reflected back through said aperture slit in the directions of arrows 72 so as to impinge upon photodiode 24, thereby causing said diode to create and maintain an electrical voltage potential across its output terminals for as long a time as the light is reflected to the diode. It may be appreciated that the time duration of said voltage potential across said terminals will be directly related to the time duration that exposure aperture slit 70 exists, and inversely related to the shutter speed of the camera body. Since, as above discussed, it is a purpose of the instant invention to measure exposure time, it may be appreciated, then, that the time duration of said voltage potential existence can be modulated and calibrated by said electric clock-circuitry to provide a direct digital visual display of exposure time in seconds or decimal fractions thereof.

The foregoing is accomplished as follows. Again referring to FIG. 3, the voltage potential output of the photodiode is impressed as input upon operational amplifier 42. This amplifier directly magnifies said voltage to a minimum threshold level and inputs to said enabling device 44 which, upon sensing said threshold voltage, activates the clock pulse generator 46. The square wave output of said generator is impressed upon decade counter 48 which codes said output into a binary-coded-decimal cumulative count signal. This count signal is then decoded by the graphic output device 51 and input into the aforesaid external graphic display means 40, thereby providing a direct, digital, visual readout of shutter exposure elapsed time.

It is noted that in the foregoing operation, exposure elapsed time has been measured at only one location along the paths of travel of said shutter-curtains; that location directly aligned with lamp-socket receptacle 20. However, it is well known that camera shutter speeds vary along the paths of travel of the shutter curtains. So as to be able to measure exposure time at an additional location along said paths, the additional lamp-socket receptacle 18 is utilized in similar fashion. That is, the reflective strip 62 now aligned with receptacle 18 and the external power source is connected to the first set pins in external plug connector 34 to energize the lamps on receptacle 18. The shutter curtains 64 and 66 are triggered by button 68 as before, and the same electronic events take place as before, i.e., the enabling device will be activated so as to actuate the clock-pulse generator circuitry and present the aforediscussed graphic display of shutter speed elasped time.

It is noted that, should it be desirable to measure shutter speed elapsed times at more than two positions along the paths of travel of the camera body shutter curtains, such as at a third position intermediate lamp-socket receptacles 18 and 20, a third lamp-socket receptacle and associated lamps need only be provided between upper and lower supporting members 14 and 16 and horizontally intermediate receptacles 18 and 20. The reflective strip 62 then need only be visually aligned with the third receptacle, and the aforediscussed operations repeated. Thus, it may be seen that with the apparatus of the instant invention, shutter speed elapsed time may be measured at any point along the paths of travel of the camera body shutter curtains.

ALTERNATE EMBODIMENT

An alternate embodiment of the instant invention is illustrated in FIGS. 6 and 7. This alternative embodiment permits the measurement of shutter speed elapsed time at two locations along the paths of travel of the shutter curtains, as discussed in the preferred embodiment, with only one lamp socket receptacle and bank of lamps.

Referring to FIGS. 6 and 7, it may be seen that, in this alternate embodiment, all components are the same as in the preferred embodiment, with the exceptions that the first set pins in external plug connector 34, lamp socket receptacle 18, and its lamps 22 are removed; and that upper and lower color-coded reference marks R and G, 74 and 76 respectively, are placed above and below remaining lamp socket receptacle 20. The marks R and G are color coded red and green, respectively.

To measure shutter speed elapse time at a first location along the paths of travel of the shutter curtains, the testing unit 2 is oriented on the camera body via the aforediscussed pins 7 and complementary slots 6 (shown in FIG. 1) so that the red reference mark R 74 is upright and the green reference mark G 76 is inverted. The reflective strip is then visually aligned, the lamps energized, and the shutter curtain button pressed, all as aforediscussed. The electronic circuitry operations and visual display are also the same as aforediscussed.

However, to measure shutter speed elapsed time at a second location along the paths of travel of the shutter curtains, the testing unit 2 is now oriented via the pins 7 and slots 6 so that the green reference mark G 76 is now upright and the red reference mark R 74 is now inverted, as illustrated in FIG. 7. That is, the testing unit and its internal components are all rotated 180° about the central cylindrical axis of the exposure aperture barrel of the camera body. In this orientation, lamp socket receptacle 20 is now both inverted and laterally displaced to the position occupied by receptacle 18 in the preferred embodiment. The reflective strip 62 is now visually aligned with receptacle 18 in this inverted position, and all operations are conducted as before, the shutter speed elapsed time readout being displayed, as before, on graphic display means 40, which is itself now inverted.

Thus it is seen that shutter speed and elapsed time may be measured at two locations with only one set of lamps.

In further additional alternate embodiments, it may be appreciated that, via slipping on other forms of electromechanical connection (not shown), the graphic display means 40 may be held in a fixed position when the testing unit 2 is rotated as above, thereby facilitating reading ease. Or, the external cannister housing 8 and graphic display means 40 may be left in place in a stationary position, and the internal components, including receptacle 18 and upper and lower supporting members 14 and 16 respectively may be rotatably mounted within said cannister housing, thereby again facilitating reading ease.

And, in still further embodiments, it may be appreciated that the dummy film strip may be eliminated, said reflective strip being affixed to or integral with the film pressure plate which is standard on most camera bodies, being located just behind the focal plane. Of course, arrangement will have to be provided for the aforediscussed visual alignment of said reflective strip with said light source.

And, it may finally be appreciated that the photodiode 24, as referred to in the foregoing disclosure, need not be restricted to a single photodiode element, but may be comprised of multiple photodiode elements arranged in a mosaic pattern depending on voltage output requirements required as input by operational amplifier 42.

I claim:

1. An apparatus for testing the exposure time of a camera comprising a housing means mountable upon said camera, a light reflecting means disposed within the focal plane of said camera, photosensitive photodiode means directed toward said light reflecting means, a light source disposed between said photosensitive photodiode means and said light reflective means and directed toward the latter, electronic clock timing means actuable by said photosensitive photodiode means to measure said exposure time, and a digital display device driven by said electronic clock timing means to display said exposure time, said light reflecting means comprising a reflective strip mounted on a non-reflective film strip.

2. The apparatus of claim 1 wherein said housing means is releasably mounted on said camera body after removal of the lens assembly of said camera.

* * * * *